INVENTORS
Jaroslav Matějka, Jiří Kaštovský
By Richard Low
Ag't

INVENTORS
Jaroslav Matějka, Jiří Kaš-
tovský
By Richard Low
ag't

DIGITAL COUNTER ARRANGEMENT

Filed Oct. 20, 1965

INVENTORS
Jaroslav Matějka, Jiří Kaštovský
By
Ag't

United States Patent Office 3,436,527
Patented Apr. 1, 1969

3,436,527

DIGITAL COUNTER ARRANGEMENT

Jaroslav Matějka, Rakovnik, and Jiří Kaštovský, Prague, Czechoslovakia, assignors to Vyzkumny ustav matematickych stroju, Prague, Czechoslovakia Filed Oct. 20, 1965, Ser. No. 498,476
Int. Cl. G06g 7/14
U.S. Cl. 235—92 6 Claims

ABSTRACT OF THE DISCLOSURE

A pair of bistable switching circuit elements is associated with each of a plurality of bistable switching circuit counter elements for counting pulses applied thereto. The states of the pair of elements are alternately switched in response to the actuation state of a counter element. Indicating devices are respectively actuated in response to the alternate actuation and deactuation of pairs of counter elements for a period coextensive with the lengths of the active periods of the counter elements.

This invention relates to counters. More particularly, it relates to novel and improved counters of both the unidirectional and the reversible type.

Electronic digital counters have widespread use in digital apparatus such as computers, numerical controls, and the like. These counters may be straight binary or binary-coded decimal counters and may be either of the type which count only in one direction or of the "up and down" type, i.e., reversible counters which count both in the forward and the reverse direction.

The foregoing counters are cycled by the application of pulse trains thereto, the counters generally comprising a plurality of bistable switching elements connected in cascade or ring arrangement. The contents of the counters are employed in digital devices such as computers, numerical machine controls, etc., at the completion of a given count, to condition the device for the next step in a program or a calculation process. However, there are many situations in which it may be desired to know the contents of a digital counter at a point in a given count or to continuously precisely know the contents of a counter. To enable the acquiring of such knowledge, heretofore, quite complex techniques and apparatus has been required which are quite costly, such techniques generally requiring the use of count detecting devices, oscilloscopes, and the like. Consequently, to avoid the use of such expensive counter contents ascertaining equipment, the counters generally have not been provided with costly count detection equipment and other types of indication arrangements have been chosen where the continuous knowledge of the state of a counter is required.

Accordingly, it is an important object of this invention to provide a digital counter in which the condition of the counter can readily be ascertained, such counter including a counter contents indicating system, the counter and the indicating system both comprising bistable elements, preferably of the same type respectively.

In the illustrative embodiments of the invention described hereinbelow, there are employed the so-called ferrotransistors. However, in accordance with the principles of the invention, other bistable type switching elements may be employed rather than ferrotransistors. A ferrotransistor comprises a ferrite toroidal core, the core material having a substantially rectangular hysteresis loop and a transistor coupled to the core. The ferrite core has provided therearound several actuating winding turns. A pulse fed to each of these turns acts to change the magnetic state of the core along its hysteresis loop, i.e., either to bring the core to an arbitrarily designated binary one state if it had been in a binary zero state or to bring it to the binary zero state if it had been in the binary one state. In the embodiments described below, the switching of the ferrite core from its binary one to its binary zero state may conveniently be termed, the "clearing" of a ferrotransistor since in the arrangement of the illustrative embodiments, the transistor coupled to ferrite core is rendered conductive during a clearing operation and a signal is produced thereby.

Counters comprising ferrotransistors or other types of bistable switching elements are known, both in straight binary counters, and in binary-coded decimal counters, i.e., counters comprising a plurality of decade stages, each stage representing a different power of 10 in the decimal system. In accordance with the invention, there is provided a counter, suitably comprising ferrotransistors as the bistable switching elements therein, for the counting function and also comprise a few additional like switching elements for the counter contents indicating function. These additional switching elements may directly control an indicating device such as a lamp or lamps, and may be suitably employed in association with either a unidirectional or a reversible counter.

A basic concept according to the invention resides in the coordinating of each bistable switching element of a unidirectional counter or each pair of bistable switching elements of a reversible counter, the counters suitably being of the binary-coded decimal type, with a pair of corresponding bistable switching elements, such coordinating being arranged whereby as long as a counter switching element in a decade is actuated, i.e., in a counting state or process, its two associated bistable switching elements in the associated indication system are continuously alternately activated to the binary one state and then cleared by the pulses produced from an appropriately timed clock pulse generator to maintain an indicating lamp illuminated during the counting process.

Generally speaking and in accordance with the invention, there is provided a counter comprising bistable switching circuit elements for counting pulses applied thereto, and a pair of bistable switching circuit elements respectively associated with each of the bistable elements in the counter. Means are included responsive to the actuation state of counter bistable switching circuit element for alternately triggering the pair of bistable switching circuit elements associated with such counter bistable circuit switching element. There are further provided indicating devices respectively actuated in response to the actuation of pairs of associated bistable switching circuit elements for a period coextensive with the lengths of the periods of the actuations of the counter bistable switching circuit elements.

For a better understanding of the invention together with other and further objects thereof, reference is had to the following description taken in conjunction with the accompanying drawing and its scope is pointed out in the appended claims.

In the drawing, FIG. 1 is a diagram, partly block and partly in schematic form, of an illustrative embodiment of a portion of a digital counter arrangement constructed in accordance with the principles of the invention and utilizing ferrotransistors as the bistable switching circuit elements therein;

Figure 1:
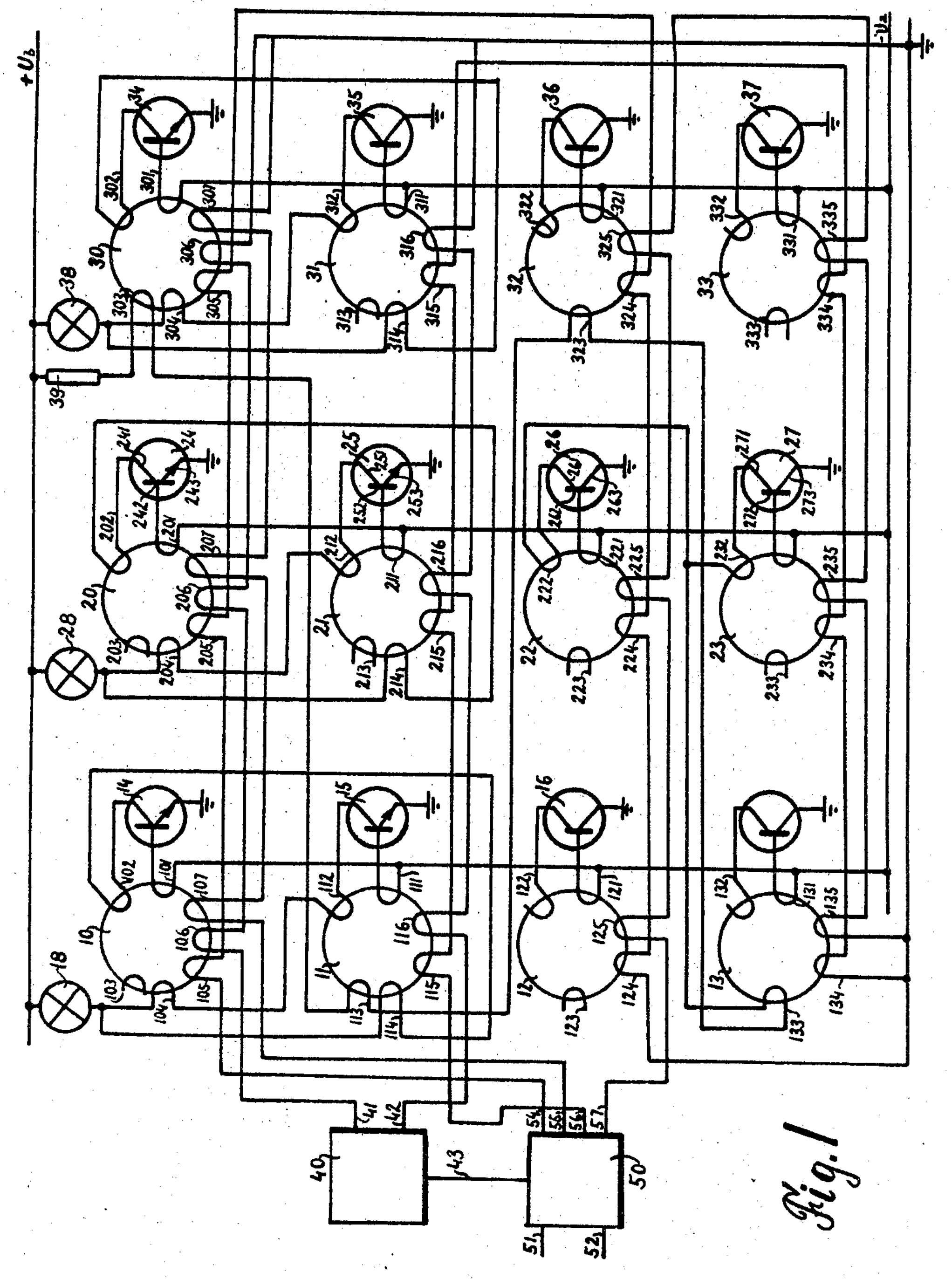

It is to be noted that in the interests of simplicity and convenience of explanation and description, there have not been included in the drawings the associated circuit components for the circuit elements shown therein, i.e., resistors for applying biasing potential to transistors, coupling capacitors, etc. The transistors, as shown in the drawings, are of the NPN type and connected in the common emitter configuration, the common connections being depicted as grounds converted to the respective emitter electrodes. In all of the figures, like structures have been designated with the same numerals.

Referring now to FIG. 1, wherein there is depicted a simplified schematic diagram of a decade of a reversible binary-coded decimal counter comprising ferrotransistors as the switching elements therein and its associated indicating system ferrotransistor switching elements, there are shown three adjacent switching elements in each of four rows of ferrotransistors. The ferrotransistors of the first and second rows, which comprise in the first row ferrite core 10 and its associated transistor 14, ferrite core 20 and its associated transistor 24, and ferrite core 30 and its associated transistor 34, and which comprise in the second row, ferrite core 11 and its associated transistor 15, ferrite core 21 and its associated transistor 25 and ferrite core 31 and its associated transistor 35, are utilized in the indicating system. The other two rows of ferrite cores and their associated transistors conveniently referred to as the third and fourth rows, constitute the counter. Thus, the third row comprises ferrite core 12 and its associated transistor 16, ferrite core 22 and its associated transistor 26, and ferrite core 32 and its associated transistor 36, and the fourth row comprises ferrite core 13 and its associated transistor 17, ferrite core 23 and its associated transistor 27, and ferrite core 33 and its associated transistor 37. Lamps 18, 28 and 38 respectively are connected in the circuits respectively of the indicating elements. Stage 40 is a clock pulse generator, which may suitably be of a known type such as self-blocking oscillator, etc., the pulse train output of clock pulse generator 40 being fed to a synchronizing circuit 50 from which there are fed modified pulses to the individual ferrite core elements.

The base electrodes 242, 252, 262 and 272 of transistors 24, 25, 26 and 27 respectively are connected to a source —U*z* of negative unidirectional potential through windings on their respective associated ferrite core elements. Thus, base 242 is connected to source —U*z* through winding 201 on ferrite core 20, base 252 is connected to source —U*z* through winding 211 on ferrite core 21, base 262 is connected to source —U*z* through winding 221 on ferrite core 22 and base 272 is connected to source —U*z* through winding 231 on ferrite core 23. The emitter electrodes 243, 253, 263 and 273 of transistors 24, 25, 26 and 27 respectively are all directly connected to ground. The collector electrode 261 of transistor 26 is connected to a positive source +U*b* of unidirectional potential through the winding 222 on its associated ferrite core 22, the winding 133 on ferrite core 13, the winding 323 on ferrite core 32, the winding 113 on ferrite core 11, the winding 303 of the ferrite core 30 and a resistor 39. The collector electrode 271 of transistor 27 is connected to source +U*b* by a winding 232 on its associated ferrite core 23, winding 133 on ferrite core 13, winding 323 on ferrite core 32, winding 113 on ferrite core 11, winding 303 on ferrite core 30 and resistor 39. The collector electrode 251 of transistor 25 is connected to positive potential source +U*b* through a winding 213 on its associated ferrite core 21, a winding 204 on ferrite core 20, and indicating lamp 28. The collector electrode 241 of transistor 24 is connected to positive potential source +U*b* by a winding 202 on its associated ferrite core 20, a winding 214 on ferrite core 21 and indicating lamp 28.

The polarities of the voltages on the base electrode windings 201, 211, 221, and 231 on ferrite cores 20, 21, 22 and 23 respectively are chosen such that transistors 24, 25, 26, and 27, associated with cores 20, 21, 22, and 23 respectively, are rendered conductive during the switching of cores 20, 21, 22 and 23 from the binary one to the binary zero state, i.e., during the clearing operation. In a similar arrangement, the polarities of the voltages on base electrode windings 101, 111, 121, and 131 of transistors 14, 15, 16, and 17 on the associated respective ferrite cores 10, 11, 12 and 13, and the polarities of the voltages on base electrode windings 301, 311, 321, 331 of transistors 34, 35, 36 and 37 on ferrite cores 30, 31, 32 and 33 respectively are chosen whereby in the clearing operation, i.e., wherein the cores are switched from the binary one to the binary zero state, their associated respective transistors are rendered conductive.

The polarities of the biasing voltages on the collector electrode windings 202, 212, 222, and 232 of transistors 24, 25, 26 and 27 on ferrite cores 20, 21, 22, and 23 respectively are chosen such that the collector current from transistors 24, 25, 26 and 27 switches cores 20, 21, 22, and 23 from their binary one to their binary zero states if they are not in the zero state, i.e., the clearing operation for the ferrite cores.

The polarities of the voltages of windings 204, 214, 133, 323, 113, and 303 on ferrite cores 20, 21, 13, 32, 11, and 30 are chosen respectively such that a ferrite core is excited by current flow through its associated windings, i.e., switched from the binary zero to the binary one state.

The windings 106, 206, 306 on ferrite cores 10, 20 and 30 respectively are connected to the output 41 of clock or timing pulse generator 40, and the polarity of their voltage is selected such that the clock pulses (pulses E in the first line waveform of FIG. 7), from generator 40 switch cores 10, 20 and 30 from the binary one to the binary zero state. The windings 116, 216, 316 on ferrite cores 11, 21 and 31 are connected to output 42 of clock pulse generator 40, such output 42 having the waveform shown in the second line in FIG. 7, the F pulses thereof, switching ferrite cores 11, 21, and 31 from the binary one to the binary zero state.

The windings 105, 205 and 305 on cores 10, 20 and 30 respectively are connected to the output 54 of a synchronizing and shaping circuit 50. The pulses P1 and P2 which are to be counted are applied to inputs 51 and 52 of circuit 50. A P1, P2 pulse is shown in the waveform in the third line of FIG. 7. These pulses are counted in both of the directions of a reversible counter. Additional windings 107, 207 and 307 of ferrite cores 10, 20 and 30 are connected to output 55 of synchronizing circuit 50 from which pulses B (as shown in the waveform of the fourth line of FIG. 7) are applied to them. Windings 105, 205 and 305 and windings 107, 207, and 307 are so polarized whereby the appearance of pulses A (as shown in the waveform of the fifth line of FIG. 7) at output 54 of synchronizing circuit 50 and the appearance of pulses B at output 55 of synchronizing circuit 50 clears ferrite cores 10, 20, and 30, i.e., switches them from the binary one to the binary zero state.

The windings 115, 215, and 315 on ferrite cores 11, 21 and 31 are connected to output 56 of synchronizing circuit 50. Here again the polarity of windings 115, 215, and 315 are so chosen whereby the presence of a pulse C (as pulse A, shown in the waveform of the fifth line in FIG. 7) appearing at output 56 of synchronizing circuit 50, switches cores 11, 21 and 31 from the binary one to the binary zero state.

The windings 124, 224, and 324 on ferrite cores 12, 22 and 32 respectively are connected to output 54 of synchronizing circuit 50. The polarity of these windings is so chosen whereby pulse A appearing at output 54 switches cores 12, 22 and 32 from the binary one to the binary zero state, i.e. clears them if they were activated at the particular time.

The windings 125, 225 and 325 on cores 12, 22, and 32 respectively are connected to the output 57 of synchronizing circuit 50. When a pulse D (as shown in the waveform of the sixth line in FIG. 7) appears at output 57, ferrite cores 12, 22, and 32 are switched from the binary one to the binary zero state, i.e., they are cleared. The same pulse D on output 57 of synchronizing circuit 50 is also applied to windings 135, 235 and 335 on cores 13, 23, and 33 respectively whereby all of cores 12, 22, and 32, and cores 13, 23 and 33 are cleared by each pulse D.

The windings 134, 234, and 334 on ferrite cores 13, 23 and 33 respectively are connected to output 56 of synchronizing circuit 50 and their polarity is so chosen as to switch ferrite cores 13, 23 and 33 from the binary one to the binary zero state upon the appearance of a pulse C on output 56 of synchronizing circuit 50 just as such pulse C switches ferrite cores 11, 21 and 31 to the binary state.

It is to be noted that, generally, all of the core state activating windings which are represented by horizontal lines in FIG. 1 (windings 103, 104, 203, 204, 303, 304, 113, 114, 213, 214, 313, 314, 123, 223, 133, 233, 333) function to activate their respective ferrite cores, i.e., place them in the binary one state, whereas the other core state activating windings function to switch their respective cores from the binary one to the binary zero state, i.e., clear their cores. The windings which connect the electrodes of the transistors to biasing potential sources are, of course, not activating windings.

Figure 7:
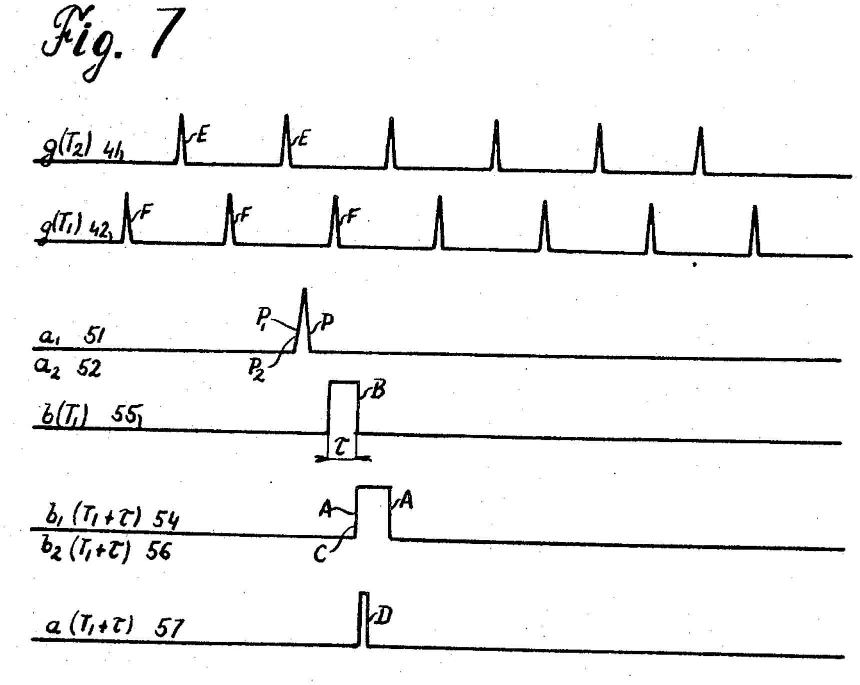
FIG. 7 is a timing diagram of waveforms occurring in the respective operations of the unidirectional and reversible counters.

Prior to considering the operation of the circuit arrangement depicted in FIG. 1, there is first noted the time relationship of the pulses in the waveforms comprising FIG. 7. In this connection, it is noted that clock pulse generator 40 produces two like pulse trains $g(T2)$ and $g(T1)$ respectively, both pulse trains having the same pulse repetition frequency, the pulses being displaced 180° in phase with respect to each other. The pulses E comprise pulse train $g(T2)$ and the pulses F comprise pulse train $g(T1)$. Synchronizing circuit 50 is connected to clock pulse generator 40 by a line 43 to insure that the output signals from circuit 50 are in synchronism and in phase with pulse train $g(T1)$, i.e. pulses F.

Synchronizing circuit 50 has two inputs, viz, inputs 51 and 52. On input 51, there is received the P1 pulse which, in a count, is to be subtracted, i.e., for a direction of counting to the left, for example, and designated $a_1$. On input 52 of synchronizing circuit 50, there appears the pulse P2 which, in a count, is to be added, i.e., for a direction counting to the right, for example, and designated $a_2$. A pulse B is generated in synchronizing circuit 50 for each incoming pulse P1, P2 at the time of the occurrence of the next clock pulse F. This pulse B has a chosen time width $\tau$. Immediately, upon the generation of pulse B, designated $b(T1)$ (because it occurs in phase with the pulses of the $g(T1)$ pulse train, i.e. pulses F), a pulse A or C is generated. The pulse A, designated $b_1(T1+\tau)$ appears on output 54 of circuit 50 when a subtracting pulse $a$, i.e., a P1 pulse is applied to circuit 50 on input 51. The pulse C, designated $b_2(T1+\tau)$, appears at output 56 of circuit 50 when an adding pulse $a_2$, i.e., a pulse P2, is applied to synchronizing circuit 50 on input 52. A counting pulse D, designated $a(T1+\tau)$ is generated simultaneously with the generation of pulse C. It is to be noted that pulse D is generated at output 57 of circuit 50 whether an addition by pulse P2 or a subtraction by pulse P1 is to be effected.

In considering the operation of the indicating arrangement, if it is assumed that ferrite core 20 is in the binary one state and the clock pulse E from output 41 of clock pulse generator 40 is applied to winding 206 thereof whereby all of ferrite cores 10, 20, and 30 are switched to the binary zero state, the clearing of ferrite core 20 causes the transistor 24 to be switched to its conductive condition by the effect of base winding 21. The collector current of transistor 24 is led through winding 202 into activating winding 214 on ferrite core 21 whereby ferrite core 21 is switched to the binary one state and to indicating lamp 28 which is illuminated. At this point, ferrite core 21 is in the binary one state and ferrite core 20 is in the binary zero state. The subsequently generated clock pulse F from output 42 of clock pulse generator, which switches all of ferrite cores 11, 21 and 31 to the binary zero state, is applied to winding 216 on ferrite core 21 whereby core 21 is switched back to the binary zero state. Consequently, at this instant, transistor 25 is rendered conductive by winding 211 connected to base 252. Thereby, current from collector 251 flows through winding 212 into activating winding 204 of core 20 which is thereby switched back to the binary one state and indicating lamp 28 is again illuminated for the duration of current in collector 251. The clock pulses E and F which are alternately generated at outputs 41 and 42 of generator 40 respectively, thus, ensure continuous switching back and forth of cores 20 and 21 with the continuous energizing and deenergizing of transistors 24 and 25 respectively associated with cores 20 and 21. Suitably, the frequency of the clock pulse trains is chosen to be quite high such as in the order of several kc. whereby, practically, lamp 28 remains continuously illuminated and the pairs of cores 10 and 11, 20 and 21, and 30 and 31 with their associated transistors 14 and 15, 24 and 25, and 34 and 35 respectively form indicating circuits with their lamps 18, 28, and 38.

If it is now assumed that a pulse P1 which is to be counted appears at input 51 of synchronizing circuit 50, at the time of occurrence of the next succeeding pulse F, a pulse B appears at output 55 of circuit 50. This latter pulse B is applied to windings 107, 207, and 307 of ferrite cores 10, 20 and 30 respectively. Since the pulse B has a duration longer than that of pulse F, a switching of the state of core 20 cannot occur and the lamp illumination is terminated. The minimum time duration $\tau$ of pulses B is determined by the requirement that they must not cause even a partial switching of the states of ferrite cores 10, 20 and 30. Upon the complete occurrence of pulse B, a longer duration of pulse A appears at output 54 of circuit 50 to prevent the switching of cores 10, 20 and 30, and cores 12, 22 and 32 to the binary one state. At output 57 of circuit 50, there appears the counting pulse D which transfers cores 12, 22, and 32 and cores 13, 23 and 33 to the binary zero state. If, for example, only core 22 is in the binary one state prior to the occurrence of the pulse P1, only this core 22 is switched from the binary one to the binary zero state by the counting pulse D whereby its associated transistor 26 is rendered conductive by its base electrode 262 winding 221. The resulting current in collector 261 of transistor 26 through windings 133, 323, 113 and 303 switches cores 13, 32, 11 and 30 respectively from the binary zero to the binary one state. Since core 11 is in the binary one state, the indicating circuit formed by cores 10 and 11, transistors 14 and 15 and lamp 18 is activated and operates as described hereinabove. The switching of core 13 from the binary zero to the binary one state causes a pulse to be subtracted, i.e., a shift to the left, and the counter is ready to receive another pulse to be counted.

When a pulse P2 appears at input 52 of circuit 50, the same duration pulse B occurs at output 55 and transfers cores 10, 20, and 30 to the binary zero state and causes clearing of the illuminated indication by preventing the switching back of these cores 10, 20 and 30 to the binary one state. Upon the occurrence of the trailing edge of pulse B, the relatively long duration pulse C appears on output 56 of circuit 50 and functions to prevent the switching of cores 11, 21 and 31 and cores 13, 23 and 33 to the binary one state, the relatively short duration pulse D appearing coincidently with pulse C at output 57 of circuit 50 to switch cores 12, 22 and 32, and cores 13, 23 and 33 to the binary zero state. If only core 22, for example, is in the binary one state prior to the occurrence of pulse P2, this core alone is transferred from the binary one to the binary zero state by counting pulse D whereby its associated transistor 26 is rendered conductive by winding 221 to its base 262. The consequent current in collector 261 of transistor 26 energizes windings 133, 323, 113, and 303 in a circuit loop and cores 32 and 30 are switched from the binary zero to the binary one state. However, at this point, cores 13 and 11 cannot be switched to the binary one state since pulse C still exists. The indicating circuit is thereby closed by cores 30 and 31, transistors 34 and 35, and indicating lamp 38. The binary one state of core 32 represents the fact that the addition of a pulse has been completed, i.e., a shift to the right, and the counter is conditioned for the next counting.

It is thus appreciated from the explanation of the operation of the arrangement of FIG. 1 that each pulse P1 causes the subtraction of a unit increment from the counter and that each pulse P2 causes the addition of a unit increment to the counter. Accordingly, the pulses P1 may conveniently be designated as "negative" pulses and the pulses P2 designated as "positive" pulses.

Figure 2:
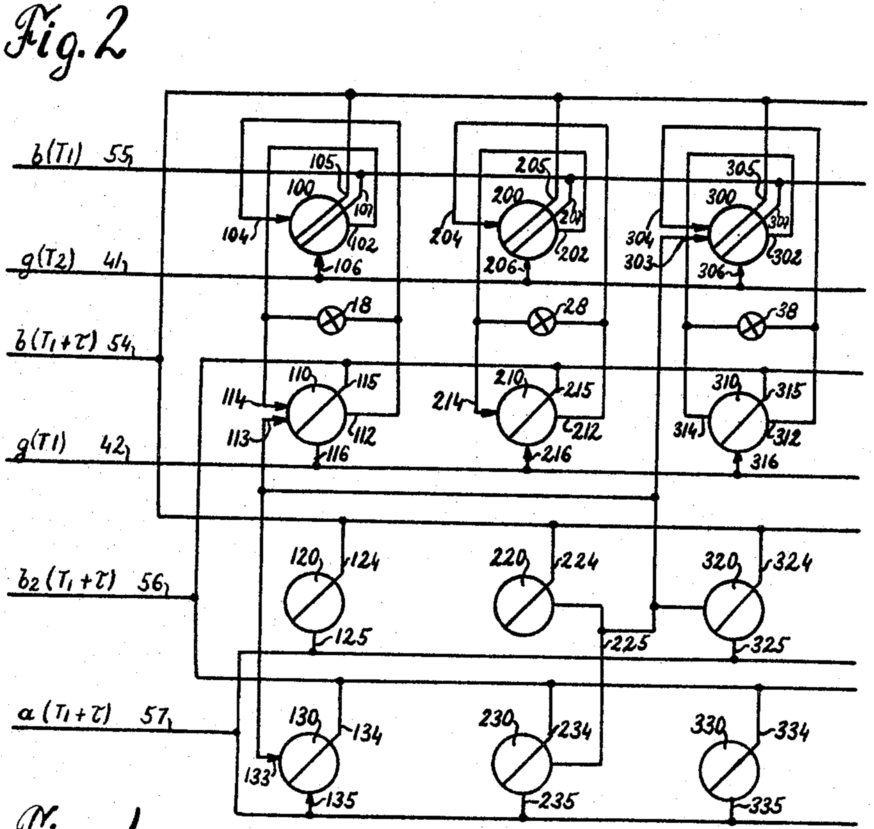
FIG. 2 is a diagram of th arrangement shown in FIG. 1 set forth in a logical presentation as a convenient aid in the explanation of the operation of the arrangement.

FIG. 2 shows the arrangement of FIG. 1 in a more concise presentation. The indicating circuits therein are represented by two rows of bistable switching circuit elements, viz, elements 100 and 110, 200 and 210, and 300 and 310 with their respective associated indicating lamps 18, 28, and 38. The switching elements of the first row, viz, elements 100, 200, and 300 are fed clock pulses $g$(T2) from line 41 by way of their respective inputs 106, 206, and 306. The switching elements 110, 210 and 310 are fed clock pulses $g$(T1) from line 42 by way of their respective inputs 116, 216, and 316. When a bistable switching circuit element such as element 210 is in the binary one state, it is switched to the binary zero state by a pulse from the $g$(T1) pulse train whereby a pulse appears at output 212 which is fed to indicating lamp 28 and to the input 204 of switching element 200 to transfer switching element 200 to the binary one state. A similar series of events occur with respect to the switching element 200 upon the occurrence of the next pulse $g$(T2) whereby switching element is returned to the binary one state by the switching of element 200 to the binary zero state through output 202 of switching element 200 and input 214 of switching element 210 respectively. The indicating lamp is maintained illuminated as long as no clearing pulse is applied to the indicating circuit. Such clearing is effected by pulses $b$(T1) which are fed to inputs 107, 207 and 307 of switching elements 100, 200 and 300 respectively via line 55. The obliquely disposed diametric lines depicted in the switching elements is to indicate that gating pulses are applied thereon to the respective switching elements, i.e., during the time duration $\tau$ of pulse $b$(T1), elements 100, 200, and 300 cannot be switched.

As shown in FIG. 7, the actual counting pulse $a(T1+\tau)$ entering the system is delayed relative to the original pulse $a_1$ or $a_2$ which is to be counted and appears only after the occurrence of the clearing pulse $b$(T1). This actual counting pulse is fed to all of the switching elements 120, 220, and 320 and 130, 230 and 330 of the counting system which are to be cleared thereby, i.e., switched from the binary one to the binary zero state. Since only a single element, such as element 220, for example, is filled, i.e., active, a pulse occurs in such situation at output 222 as a result of the clearing of element 220, this pulse being applied to the inputs 323 and 303 of switching elements 320 and 300 respectively and to inputs 113 and 133 of elements 110 and 130 respectively. Element 320 is associated with elements 120 and 220 in a first series of couting elements and element 300 is associated with elements 100 and 200 in a first series of indicating elements. Elements 110 and 130 are respectively associated with elements 210 and 310, and 230 and 330 in a second series of indicating and counting elements. Simultaneously with the occurrence of the counting pulse $a(T1+\tau)$, one of the blocking pulses $b_1(T1+\tau)$ or $b_2(T1+\tau)$ is produced by synchronizing circuit 50, the pulse $b_1(T1+\tau)$ blocking the first series and the pulse $b_2(T1+\tau)$ blocking the second series of both the counting and the indicating systems respectively. Thus, switching elements 130 and 110 are actuated when the pulse $b_1(T1+\tau)$ is generated and the indicating lamp is activated instead of indicating lamp 28 being illuminated. If the pulse $b_2(T1+\tau)$ is generated, the elements 300 and 320 are activated and indicating lamp 38 rather than indicating lamp 28 is illuminated. In the case where lamp 18 is illuminated, a subtraction has been performed and in the case where lamp 38 is illuminated an addition has been performed. It is immaterial as to which of the two elements 220 or 230 of the counting system was activated at the beginning of the process since outputs 222 and 232 are connected to each other as is shown in FIG. 2. The other elements, i.e., 120 and 130, and 320 and 330, have their outputs similarly coupled together as do elements 220 and 230 but such coupling has been omitted from FIG. 2 in the interests of simplicity.

It is to be noted that a pulse to be applied to the first switching element of the next succeeding decade and a pulse to be applied to the first element of the decade itself are transmitted by a coupling from the last element of the decade. In the same manner, a counting pulse transmitted toward an element on the left (as seen in the drawing) is supplied from the first element of a decade to both the last element of that same decade and to the last element of the immediately preceding decade.

Figure 3:
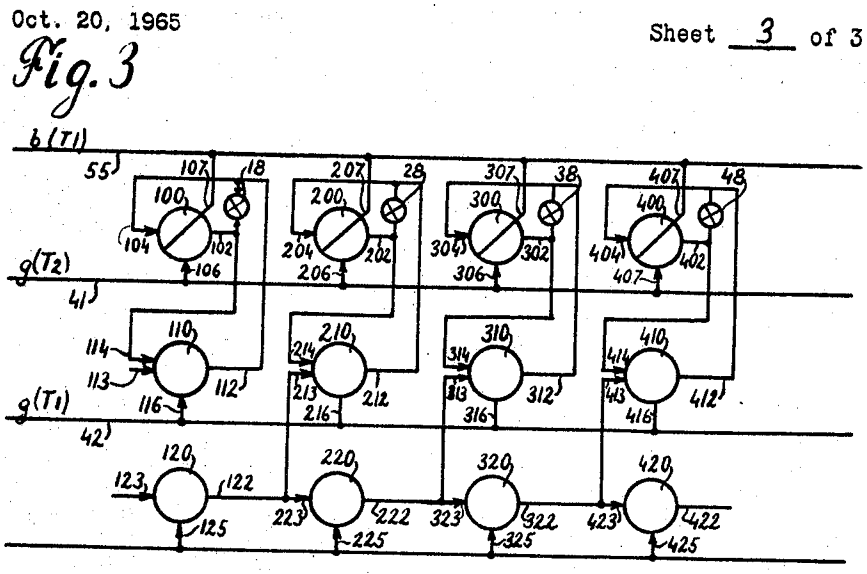
FIG. 3 shows a diagram of a unidirectional counter constructed in accordance with the principles of the invention.

FIG. 3 is a diagram of a unidirectional counter which lends itself, in accordance with the principles of the invention, to substantial simplification as compared to the arrangement of the reversible counter shown in FIGS. 1 and 2. In this connection, it is seen from a comparison of the arrangements of FIGS. 1 and 2 wherein the same numerals are employed to designate corresponding structures that the second series or row of elements 130, 230, and 330 of the counting system of the arrangements of FIGS. 1 and 2 and the lines 54 and 56 thereof for providing the $b_1(T1+\tau)$ and the $b_2(T1+\tau)$ blocking pulses are omitted in the arrangement of FIG. 3. Otherwise the arrangement depicted in FIG. 3 is substantially the same as that shown in FIG. 2 and the operation thereof is described in conjunction with the waveform timing diagram of FIG. 7. The designating notations on the left ends of the lines of FIG. 7 apply to the reversible counter arrangement of FIGS. 1 and 2 whereas the designating notations on the right ends of the lines of FIG. 7 apply to the unidirectional counter arrangement shown in FIG. 3. The system of FIG. 3 receives its clock pulses $g$(T1) and $g$(T2) from the clock pulse generator 40 depicted in block form in FIG. 4 which is the same as circuit 40 in FIG. 1 but in the arrangement of FIG. 3, the complicated synchronization circuit 50 of FIG. 1 is replaced by the synchronization circuit 50*a* shown in block form in FIG. 5.

In considering the operation of the arrangement of FIG. 3, let it be assumed that switching element 220 in the counter therein is actuated whereby indicator 28 is illuminated because switching elements 200 and 201 in the indicating system are respectively alternately actuated and cleared, i.e., switched to the binary one state and then switched to the binary zero state by the alternately occurring pulses $g$(T1) and $g$(T2), the indicator 28 receiving an actuating pulse at each clearing. If a pulse P which is to be counted appears at the input 51 of the synchronizing circuit 50a, a clearing pulse $b$(T1) occurs at the output 55 of circuit 50a at the time of a $g$(T1) pulse. The occurrence of the latter pulse prevents the switching of element 200 and thereby interrupts the actuating of indicating lamp 28. The counting pulse $a(T1+\tau)$, however, appears immediately thereafter on output 57 of circuit 50a to switch, i.e., clear element 220 to the binary zero state whereby a pulse appears on output 222 of element 220 which actuates element 320 of the counting series and also the indicating circuit associated with element 320, i.e., elements 300 and 310 and indicating lamp 38. Indicating lamp 38 is maintained illuminated by the alternate switching of elements 300 and 310 to their binary one states and back to their binary zero states.

Figure 4:
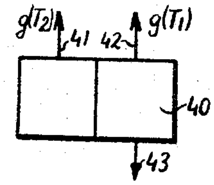
FIG. 4 is a block depiction of the clock pulse generator used in the invention.
Figure 6:
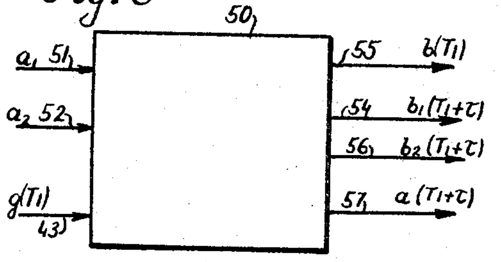
FIGS. 5 and 6 are respectively block diagrams of synchronizing circuits which may suitably be respectively employed in unidirectional and reversible counters constructed in accordance with the principles of the invention.
Figure 5:
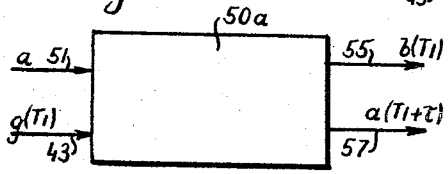

It is readily understood that clock pulse generator 40 shown in FIG. 4 obtains equally in both the reversible counter arrangement of FIGS. 1 and 2 and the unidirectional counter arrangement of FIG. 3. However, the synchronizing circuit 50a shown in FIG. 5 is utilized only in the arrangement of FIG. 3 since, for this arrangement, there are required only the necessary outputs 55 and 57 for pulses $b$(T1) and $a(T1+\tau)$ respectively. The somewhat more complex synchronizing circuit 50 shown in block form in FIG. 6 has to be employed in the arrangement of FIGS. 1 and 2. Circuit 50, in addition to having inputs 51 and 43 and outputs 55 and 57 in common with circuit 50a also has the additional input 52 for $a_2$ pulses and the additional outputs 54 and 56 for the $b_1(T1+\tau)$ and $b_2(T1+\tau)$ pulses respectively.

All of the pulses are shown in the timing diagram of FIG. 7, each numeral indicating the reference character of the associated line. On the right ends of the lines there are indicated only those pulses which occur in the simple counter arrangement of FIG. 3. On the left of the lines, there are indicated all of the pulses occurring in the reversible counter arrangement of FIGS. 1 and 2. The notations above a line designate a negative pulse $a_1$ appearing at the input to circuit 50 and the notations below the line designate a positive pulse $a_2$ appearing at the input to circuit 50.

It is to be realized that the invention is not limited to the specific embodiments thereof which are illustrated herein, but is concerned with the providing of a simple arrangement of indicating digital counter activity, the switching circuit elements therein suitably being appropriate bistable switching devices.

While there have been described what are considered to be the preferred embodiments of this invention, it will be obvious to those skilled in the art that various changes and modifications may be made therein without departing from the invention and it is, therefore, aimed in the appended claims to cover all such modifications as fall within the spirit and scope of the invention.

What is claimed as new and desired to be secured by Letters Patent of the United States is:

1. A counter comprising bistable switching circuit counter elements for counting pulses applied thereto, a pair of bistable switching circuit elements associated with each of said bistable counter elements, means responsive to the actuation state of a bistable counter element for alternately switching the states of the pair of bistable elements associated with said bistable counter element, and indicating devices respectively actuated in response to the alternate actuation and deactuation of pairs of associated bistable counter elements for a period coextensive with the lengths of the active periods of said bistable counter elements.

2. A counter comprising a plurality of bistable switching circuit counting elements arranged to count pulses applied thereto, a plurality of pairs of first and second bistable circuit switching elements, each of said pairs being associated with one of said counting elements, each element of one of said pairs having its output applied as an input to the other element of the pair whereby the switching of one of said elements to a given binary state causing the switching of the other of said elements to the opposite binary state, a clock pulse generator for producing two like pulse trains displaced in phase 180°, means for applying said first pulse train to said first elements to switch said first elements to one of the binary states, means for applying said second pulse train to said second elements to switch said second elements to said one binary state, a plurality of indicating means each in circuit with one of said pairs and actuated in response to the switching of the states of the elements in its associated pair, a synchronizing circuit for applying thereto pulses to be counted and for producing in response to said application of said last named pulses, first derived pulses having a time of occurrence in phase with the pulses of one of said pulse trains and having a duration substantially greater than said pulse train pulses, second derived pulses having a time of occurrence at the end of said first derived pulses and having a relatively short duration, means for applying said first derived pulses to said pairs of elements to inhibit the switching of their states by said clock pulses to thereby deactuate said indicating devices, and means for applying said second derived pulses to said counting elements to cycle them, the switching of one of said counting elements to an opposite binary state causing a switching of the state of the next succeeding counting element and the switching of the state of one of its associated pair of elements, said last named switching causing said last mentioned pair to resume alternate switching by said clock pulse trains to actuate their respective associated indicating device.

3. A counter as defined in claim 2, wherein said counting elements are arranged as a reversible counter and wherein said counting elements comprise a first series and a second series, wherein said synchronizing circuit produces third derived pulses occurring coincidentally with said second derived pulses but which have a duration substantially equal to that of said first derived pulses, wherein said first derived pulses are applied to said first elements of said pairs and the counting elements of said first series, and further including means for applying said third derived pulses to said second elements of said pairs and the counting elements of said second series, said first derived pulses inhibiting the switching of said first elements of said pairs and switching the states of said first series elements, said third derived pulses inhibiting the switching of the second elements of said pairs and switching the states of said second series elements, said second derived pulses causing said counter to cycle and causing the associated pair of elements of a corresponding first or second series actuated element to resume their switching by said pulse trains to thereby actuate their associated indicating device.

4. A counter as defined in claim 2, wherein each of said bistable elements comprises a ferrite core having windings therearound for applying said pulses thereto and an additional winding therearound connected to the input of an active device, the operating biasing voltages of said active devices being so chosen that said active devices are in the cut off state when their associated ferrite cores are in a given binary state and are rendered conductive when their associated ferrite cores are switched to the binary state opposite to said given state, the output of an active device in a pair being applied as input to the ferrite core of the other element of said pair.

5. In a counter as defined in claim 3, wherein said third derived pulse is applied to said first elements of said pairs and said first series of counting elements when a unit increment is to be subtracted and wherein said third derived pulse is applied to said second elements of said pairs and said second series of counting elements when a unit increment is to be added.

6. In a counter as defined in claim 5, wherein the outputs of corresponding counting elements of said first and second series have their outputs connected together and wherein said connected together output is connected as an input to the next succeeding counting element of said first series, the immediately preceding counting element of said second series, the first element of the pair associated with said next succeeding first series counting element, and the second element of the pair associated with said immediately preceding second series counting element.

References Cited

UNITED STATES PATENTS 3,372,265 3/1968 Gordon.

MAYNARD R. WILBUR, *Primary Examiner.*

GREGORY J. MAIER, *Assistant Examiner.*

U.S. Cl. X.R.

340—166